United States Patent [19]
Dillon

[11] Patent Number: 5,849,390
[45] Date of Patent: Dec. 15, 1998

[54] FENDER COVER HAVING REPOSITIONABLE POCKETS

[76] Inventor: Patrick Dillon, 172 River Dr., Lake Hiawatha, N.J. 07034

[21] Appl. No.: 841,404

[22] Filed: Apr. 30, 1997

[51] Int. Cl.$^6$ .................................................. B60R 11/06
[52] U.S. Cl. .......................... 428/99; 150/166; 280/770; 224/495; 224/548; 224/559; 224/560; 428/100
[58] Field of Search ..................... 428/99, 100; 280/770; 224/534, 488, 495, 548, 559, 560; 150/166

[56] References Cited

U.S. PATENT DOCUMENTS

| | | | |
|---|---|---|---|
| 3,298,712 | 1/1967 | Greenstadt | 280/770 |
| 4,192,365 | 3/1980 | Siegel | 150/35 |
| 4,843,994 | 7/1989 | Wilson et al. | 114/219 |
| 4,884,824 | 12/1989 | Radke | 280/770 |
| 4,895,753 | 1/1990 | Etter | 428/286 |
| 4,924,543 | 5/1990 | Hoss et al. | 5/484 |
| 5,195,778 | 3/1993 | Dismuke | 280/770 |
| 5,290,618 | 3/1994 | Olson et al. | 428/100 |
| 5,394,565 | 3/1995 | Stewart et al. | 2/69 |
| 5,460,305 | 10/1995 | Ahearn | 224/562 |

Primary Examiner—Alexander Thomas
Attorney, Agent, or Firm—Terrance L. Siemens

[57] ABSTRACT

A fender cover having removable, repositionable pockets. The fender comprises a main panel of flexible material of characteristics suitable for protecting painted finishes and similar delicate surfaces. The main panel has snap fasteners disposed in plural rows on both sides of the main panel. A pocket bearing member having a plurality of separate but adjacent pockets has corresponding snap fasteners enabling the pocket bearing member to be fastened on the main panel selectively at a variety of locations. More than one pocket bearing member may be provided and fastened to the main panel. The fender cover has eyelets for tying to an environmental surface. Optionally, the fender cover also has suction cups for adhering to a smooth surface by suction.

7 Claims, 2 Drawing Sheets

FENDER COVER HAVING REPOSITIONABLE POCKETS

BACKGROUND OF THE INVENTION

1. Field of the Invention

The present invention relates to work aprons or covers adapted for protecting fenders of motor vehicles during mechanical service being performed in the engine compartment. More particularly, the invention comprises a fender cover having adjustably positioned tool pockets.

2. Description of the Prior Art

Road going motor vehicles, boats, airplanes, and similar conveyances frequently have body panels which are susceptible to scratching and other deleterious influences, and engine compartments which contain a great many mechanical components and systems which periodically require repairs and maintenance. Most engine compartments are provided with a cover which may be tilted into an open position affording access to the components of the engine compartment. There is frequently no convenient way for a person to perform mechanical work to the components within the engine compartment without leaning on or against a fender or other body panel adjacent the engine compartment.

Protective covers are commonly employed to prevent scratching and other damage to painted surfaces of the motor vehicle. These covers are generally effective in protecting delicate surfaces and in providing support for tools and small parts, but are not necessarily easy to secure in place. This is true since fender covers are general purpose devices normally not specifically designed to cooperate with and engage structure of specific motor vehicles. Appropriate attachment of the cover to the vehicle during service becomes dependent upon attachment apparatus provided with the cover. The prior art has provided hooks, ties straps, and embedded magnets for adhering to a vehicle. Any one attachment may be suitable in any one application yet inadequate in others. In an example, U.S. Pat. No. 4,843,994, issued to Jeffery D. Wilson et al. on Jul. 4, 1989, describes a boat fender cover having attachment straps including eyes for cooperating with turnbuckles formed on an associated boat. However, these eyes are located on straps designed to cooperate with specific structure found on boats, and would not be of use with road going motor vehicles and airplanes in most cases. Also, the device of Wilson et al. lacks repositionable pockets as found in the present invention.

In a second example, U.S. Pat. No. 5,290,618, issued to Richard R. Olson et al. on Mar. 1, 1994 describes a fender protector which engages the engine compartment of a motor vehicle by a resilient cable terminating in hooks. By contrast, the present invention includes eyelets for tying an external cable. The device of Olson et al. lacks the repositionable pockets of the present invention.

Because many different types of repair and maintenance operations must be undertaken, supporting structure for holding tools and small parts and materials is likely to be inadequate in specific applications.

The prior art has answered by providing covers having a wide selection of pockets. This is seen in U.S. Pat. Nos. 5,195,778, issued to Keith T. Dismuke on Mar. 23, 1993, and 5,460,305, issued to Michael J. Ahearn on Oct. 24, 1995. Dismuke covers much of the surface area of his utility apron with pockets. Ahearn provides a combination of loops having open bottom ends for passing elongated handles therethrough and pockets having closed bottom ends. Dismuke fastens his apron with hooks, whereas Ahearn utilizes magnets embedded in his cover. Both Dismuke and Ahearn lack eyelets for tying the cover in place and repositionable tool or part pockets, these features being found in the present invention.

None of the above inventions and patents, taken either singly or in combination, is seen to describe the instant invention as claimed.

SUMMARY OF THE INVENTION

The present invention provides a fender cover affording versatility in location of pockets for holding tools, parts and materials. The pockets attach to the principal flexible panel of the cover by snaps. The pockets may be unsnapped and moved to a new location on the cover and refastened, or may be temporarily removed during work. This versatility may prove extremely convenient, since a person servicing road going motor vehicles, airplanes, boats, farm and construction vehicles, and industrial equipment may be required to assume many different positions to be able to reach and work on the mechanical components being serviced.

It is not always the case that the body or chassis of the equipment being serviced provides suitable steps, ledges and shelves, and vertical surfaces for supporting tools, parts, materials, and protective covers. Access to the cover and to contents of the pockets may prove awkward at best. In such situations, considerable time and energy may well be saved by locating the cover advantageously on the equipment being served and by placing individual pockets appropriately on the cover so that tools and materials will be readily at hand.

Similarly, there may be no convenient structure for engaging attachment apparatus such as hooks. If the body being protected is fabricated from a synthetic resin, fiberglass, or aluminum or another magnetically unresponsive metal, then magnetic attraction may fail. Eyelets are provided for tying the novel fender cover where it cannot be conveniently draped over a fender. In particular, tying is appropriate where it is desirable that the fender cover be suspended vertically. This frequently occurs when protection of a body or fender is not appropriate, but it is desired to provide suitable storage for tools and materials.

Fasteners other than snaps may be provided for removably attaching pockets to the cover. For example, hook and loop material may be selected. However, metallic snaps are more resistant to degradation by contact with oil and solvents and by passage of time and exposure to heat.

Accordingly, it is a principal object of the invention to provide a fender cover having repositionable pockets for holding tools, small parts, and materials.

It is another object of the invention that the pockets be removable from the cover.

It is a further object of the invention to provide eyelets for tying the novel cover selectively to and above equipment being serviced.

Still another object of the invention is to provide metallic snaps as fasteners for removably attaching the pockets to the novel fender cover.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
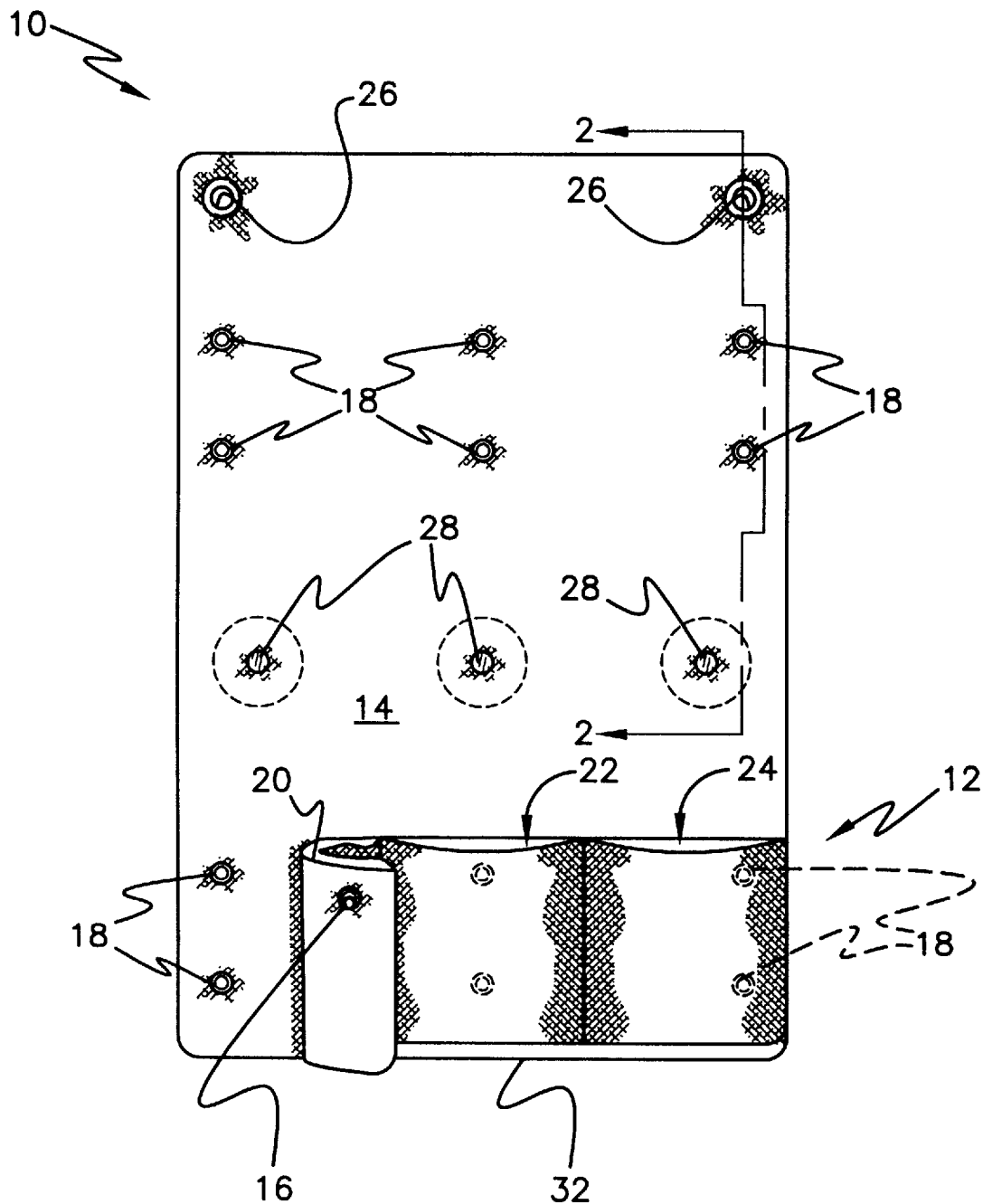
FIG. 1 is a front elevational view of the invention, with a removable pocket component shown removed from the main panel of the novel fender cover.

FIG. 1 of the drawings shows the novel fender cover 10 wherein a pocket bearing member 12 has been removed from main panel 14. Pocket bearing member 12 is manually and removably attachable to main panel 14 by male components 16 of snap fasteners, main panel 14 having corresponding female components 18 of metallic snap fasteners. Pocket bearing member 12 has at least one pocket, and preferably three pockets 20, 22, 24 as depicted. As employed herein, the term pocket encompasses a receptacle having lateral walls and a closed bottom end. The top of a pocket is open for insertion of tools, parts, or any object being temporarily stored.

Main panel 14 is fabricated from a suitable flexible material selected from any known material which has surface characteristics known not to scratch painted surfaces. In addition to female components 18 of snap fasteners, main panel 14 has two eyelets 26 located at two adjacent corners of main panel 14 for receiving a cord or the like for tying fender cover 10 to an environmental object. This attachment is particularly suited for suspending fender cover 10 in a vertical orientation.

A second form of attachment is optionally accommodated by providing a row of suction cups 28 of any well known type suitable for adhering fender cover 10 to a smooth surface (not shown) by suction. Suction cups 28 may be utilized to constrain fender cover 10 from slipping when draped over a curved fender (not shown), thereby obviating any need to balance fender cover 10 precisely on the fender or to secure fender cover 10 by tying or by other engagement with an external object.

While pocket bearing member 12 may have only one pocket, it is preferred to offer a selection of pockets 20, 22, 24 of different sizes, arranged in a horizontal row and disposed adjacent one another, for segregating stored objects (not shown) according to type, size, or any other criterion. As depicted, two horizontal rows of female components 18 of snap fasteners are located at top edge 30 of main panel 14. An additional two horizontal rows are located proximate bottom edge 32 of main panel 14. This arrangement affords selection in locating a pocket bearing member 12.

Figure 2:
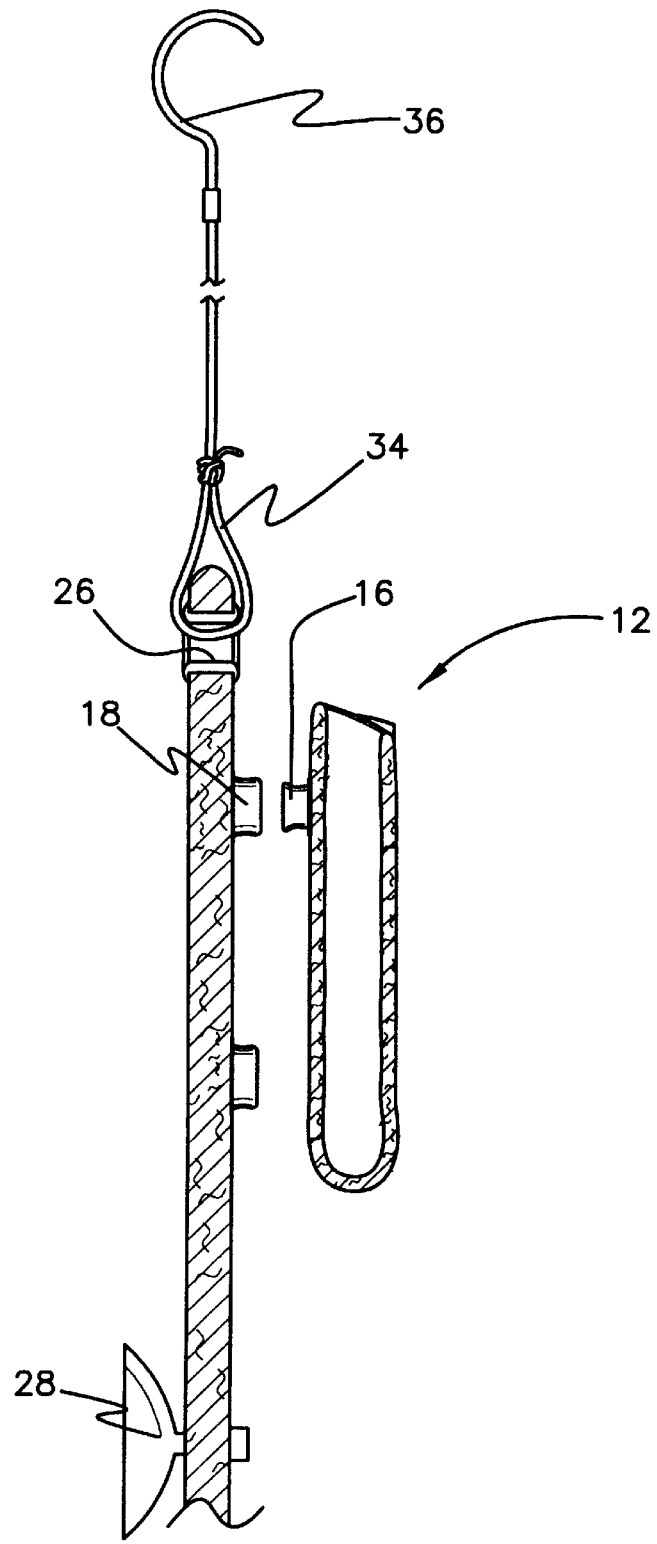
FIG. 2 is an environmental, side cross sectional detail view of the invention, with pocket components shown spaced apart from the main panel of the novel fender cover.

As shown in FIG. 2, female members 18 of the snap fasteners receive male members 16 of member 12. The plurality of rows of female members 18 enables more than one pocket bearing member 12 to be mounted to main panel 14 simultaneously. Only one pocket bearing member 12 is shown in FIG. 2. That side of main panel 14 bearing female components 18 of snap fasteners will be called the front side, and that side having suction cup 28 will be called the rear side.

FIG. 2 also shows attachment of fender cover 10 by tying. A cord 34 which optionally terminates in one or more hooks 36 penetrates through the opening of each eyelet 26.

The present invention is susceptible to variations and modifications which may be introduced without departing from the inventive concept. For example, female and male components of the snap fasteners may be reversed from the locations described above, in that male members may be secured to main panel 14. Female members may be provided in numbers excessive for the number of male members, for the purpose of increasing available mounting positions for pocket bearing members 12. Numbers and arrangements of snap fasteners, suction cups, and eyelets may be varied to suit.

Snap fasteners may be replaced by other fasteners, such as hook and loop material (not shown), or by any other suitable manually replaceable fastener.

It is to be understood that the present invention is not limited to the embodiments described above, but encompasses any and all embodiments within the scope of the following claims.

I claim:

1. A substantially planar fender cover for covering fenders and storing work materials, comprising:

a main panel of flexible material comprising a sheet having a front side, a rear side, and a plurality of peripheral edges; and a pocket bearing member having at least one pocket, said pocket bearing member attachable to said main panel, said fender cover having pocket fasteners for removably and manually attaching said pocket bearing member to said main panel, said pocket bearing member having a plurality of separate pockets disposed adjacent one another.

2. The fender cover according to claim 1, said main panel further comprising eyelets for enabling penetration of a cord for tying said fender cover to an environmental object.

3. The fender cover according to claim 1, said pocket fasteners disposed upon said main panel to enable said pocket bearing member to be mounted selectively proximate one said edge of said main panel and proximate a different edge of said main panel.

4. The fender cover according to claim 3, said fasteners disposed upon both said front side and said rear side of said main panel to enable said pocket bearing member to be mounted selectively on both said front side and said rear side of said main panel.

5. The fender cover according to claim 1, said pocket fasteners comprising metallic snap fasteners wherein each said snap fastener has a male member disposed upon one of said pocket bearing member and said main panel and a female member disposed upon the other one of said pocket bearing member and said main panel.

6. A fender cover for covering fenders and storing work materials, comprising:

a main panel of flexible material; and a pocket bearing member having at least one pocket, said pocket bearing member attachable to said main panel, said fender cover having pocket fasteners for removably and manually attaching said pocket bearing member to said main panel, further comprising at least one suction cup disposed upon said main panel, for adhering said fender cover to a smooth surface by suction.

7. A fender cover for covering fenders and storing work materials, comprising:

a main panel of flexible material having a front side, a rear side, a plurality of peripheral edges, and comprising eyelets for enabling penetration of a cord for tying said fender cover to an environmental object, and having at least one suction cup disposed upon said main panel, for adhering said fender cover to a smooth surface by suction, and a plurality of female members of metallic snap fasteners disposed upon said front side and said rear side; and a pocket bearing member having a plurality of separate pockets disposed adjacent to one another, said pocket bearing member attachable to said main panel, said fender cover having male members of metallic snap fasteners for removably and manually attaching said pocket bearing member to said main panel, said female members of snap fasteners disposed upon said main panel to enable said pocket bearing member to be mounted selectively proximate one edge of said main panel and proximate a different edge of said main panel.

\* \* \* \* \*